US009690874B1

(12) United States Patent
Pidathala et al.

(10) Patent No.: US 9,690,874 B1
(45) Date of Patent: Jun. 27, 2017

(54) SOCIAL PLATFORM FOR DEVELOPING INFORMATION-NETWORKED LOCAL COMMUNITIES

(71) Applicant: Skopic, Inc., San Jose, CA (US)

(72) Inventors: Murali P. Pidathala, San Jose, CA (US); Ravindra B. Gudapati, Saratoga, CA (US)

(73) Assignee: Skopic, Inc., San Jose, CA (US)

( * ) Notice: Subject to any disclaimer, the term of this patent is extended or adjusted under 35 U.S.C. 154(b) by 406 days.

(21) Appl. No.: 14/263,609

(22) Filed: Apr. 28, 2014

Related U.S. Application Data

(60) Provisional application No. 61/816,412, filed on Apr. 26, 2013.

(51) Int. Cl.
G06F 17/30 (2006.01)

(52) U.S. Cl.
CPC .............. *G06F 17/30985* (2013.01)

(58) Field of Classification Search
CPC ......... G06F 17/30386; G06F 17/30864; G06F 17/30985
USPC ....................................... 707/758
See application file for complete search history.

(56) References Cited

U.S. PATENT DOCUMENTS

| 6,615,172 | B1 * | 9/2003 | Bennett | G06F 17/2775 704/257 |
| 6,633,846 | B1 * | 10/2003 | Bennett | G06F 17/3043 704/257 |
| 6,665,640 | B1 * | 12/2003 | Bennett | G06F 17/3043 704/257 |
| 6,701,309 | B1 * | 3/2004 | Beeferman | G06F 17/30646 |
| 7,050,977 | B1 * | 5/2006 | Bennett | G06F 17/2775 704/270.1 |
| 7,392,185 | B2 * | 6/2008 | Bennett | G06F 17/27 704/243 |
| 7,555,431 | B2 * | 6/2009 | Bennett | G06F 17/27 704/255 |
| 2001/0047355 | A1 * | 11/2001 | Anwar | G06F 17/30395 |
| 2008/0294637 | A1 * | 11/2008 | Liu | G06F 17/30861 |
| 2009/0019060 | A1 * | 1/2009 | Beckerman | G06Q 50/20 |
| 2009/0307100 | A1 * | 12/2009 | Nguyen | G06Q 30/0601 705/26.1 |
| 2010/0030769 | A1 * | 2/2010 | Cao | G06F 17/30696 707/738 |
| 2010/0235311 | A1 * | 9/2010 | Cao | G06F 17/30867 706/46 |

(Continued)

Primary Examiner — Sheree Brown
(74) Attorney, Agent, or Firm — Pillsbury Winthrop Shaw Pittman LLP

(57) ABSTRACT

According to certain aspects, the present invention provides a social platform for developing informed communities. These communities are either hyper local or super focused within a specific geographical location; the social information created within the system of the invention is organized, mined and delivered to other community peers seeking information about important and time critical daily matters. Since these communities are organized around common interests, geographical location and/or goals, the participants will benefit from the information shared by their community peers. In embodiments, users of the invention's communities can ASK, SAY and stay connected with information on daily matters in their local communities that are organized around family, living, neighborhoods, schools, activities, special interests or causes.

32 Claims, 6 Drawing Sheets

(56) References Cited

U.S. PATENT DOCUMENTS

| | | | |
|---|---|---|---|
| 2011/0246910 A1* | 10/2011 | Moxley | G06F 17/30861 715/758 |
| 2012/0059816 A1* | 3/2012 | Narayanan | G06F 17/30867 707/710 |
| 2012/0173992 A1* | 7/2012 | D'Angelo | G06F 17/30654 715/751 |
| 2014/0289231 A1* | 9/2014 | Palmert | G06F 17/30719 707/723 |

* cited by examiner

SOCIAL PLATFORM FOR DEVELOPING INFORMATION-NETWORKED LOCAL COMMUNITIES

CROSS-REFERENCE TO RELATED APPLICATIONS

The present application claims priority to U.S. Prov. Appln. No. 61/816,412, filed Apr. 26, 2013, the contents of which are incorporated herein by reference in their entirety.

FIELD OF THE INVENTION

The present invention relates to networks and more particularly to a social platform for developing informed local communities.

BACKGROUND OF THE INVENTION

Most traditional social media applications such as Facebook, LinkedIn and Google+ primarily focus on sharing content and posting comments within the specified distance of a specific user's network and also facilitate connecting to individuals. A need remains, however, for a social media application that provides instant information networking within a specific local community, rather than just for specific individuals.

SUMMARY OF THE INVENTION

According to certain aspects, the present invention provides a social platform for developing informed communities. These communities are either hyper local or super focused within a specific geographical location; the social content created within is organized, mined and delivered to other community peers seeking information about important and time critical daily matters. Since these communities are organized around common interests or goals within a specific geographical location, the participants will benefit from the information shared by their community peers. In embodiments, users of the invention's communities can ASK, SAY and stay connected with information on daily matters in their local communities that are organized around family, living, neighborhoods, schools, activities, special interests or causes.

According to these and other aspects, embodiments of the invention include a method comprising: maintaining, by a computer system, a plurality of communities, each comprising a plurality of users; providing, by the computer system, an ASK module for users belonging to a specific one of the communities to post ASKs in the specific community; providing, by the computer system, a SAY module for users belonging to the specific community to post SAYs in the specific community; uniquely associating the posted ASKs and SAYs with the specific community; and upon posting of a new ASK in the specific community by a certain one of the users belonging to the specific community: automatically by the computer system performing a search of the posted ASKs for the specific community having text matching the new ASK, for any posted ASKs matching the new ASK, automatically determining by the computer system whether any posted SAYs for the specific community are directed to those matching ASKs, and presenting all matching ASKs and any directed SAYs to the certain user.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Among other things, the present inventors recognize that most traditional social media applications primarily focus on connecting individuals and sharing specific information about these individuals. The present inventors further recognize that there is a need for a social media application that is instead focused on networking and connecting information shared within a community to other peers seeking information on a related matter.

According to certain aspects, therefore, the present invention provides a social platform for developing informed communities. These communities are preferably local to and/or focused within a specific geographical location. The social content created within these communities is organized, mined and delivered to other community peers seeking information about important and time critical daily matters. Since the communities are organized around common interests, geographical location and/or goals, the participants will benefit from the information shared by their community peers. In embodiments, users of the invention's communities can ASK, SAY and stay connected with information on daily matters in their local communities that are organized around family, living, neighborhoods, schools, activities, special interests and/or causes.

Figure 1:
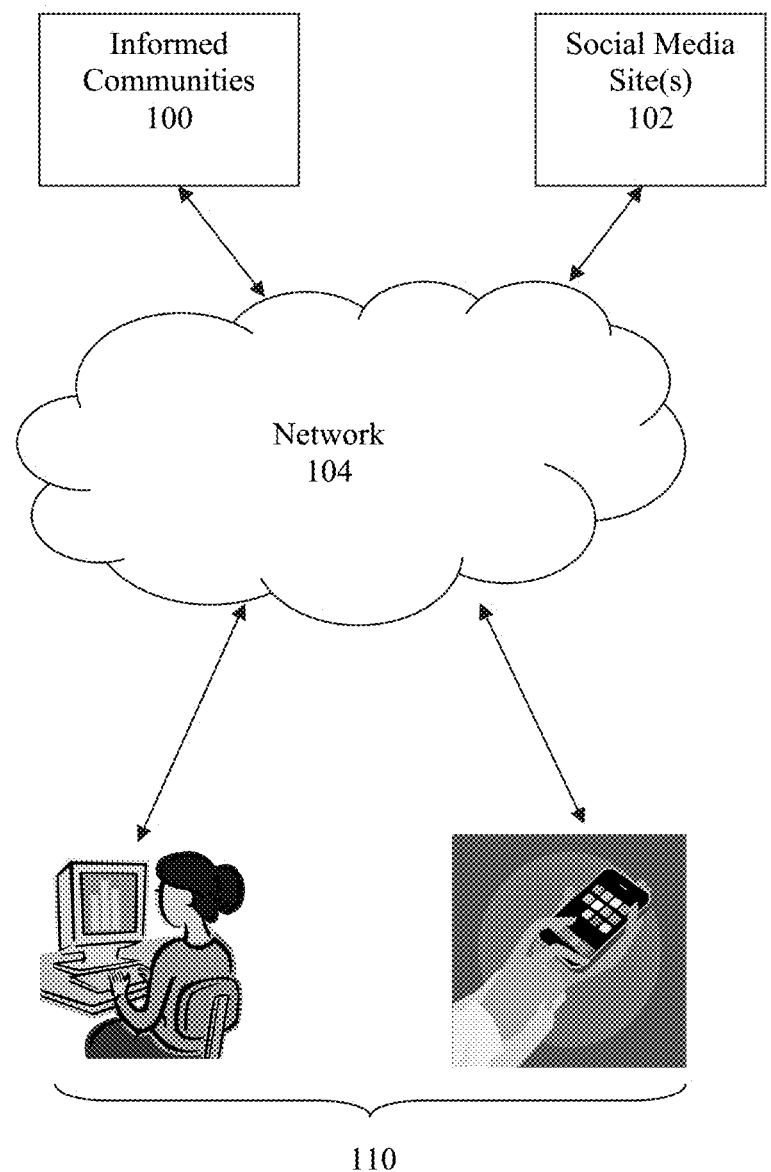
FIG. 1 is a block diagram illustrating embodiments of the present invention.

FIG. 1 is a block diagram illustrating aspects of embodiments of the invention. As generally shown in FIG. 1, the present invention can be embodied in an informed communities system 100. System 100 communicates with users 110-1 to 110-N having associated host devices via Network 104 to facilitate, maintain and develop informed communities as will be described in more detail below.

System 100 can be implemented by one or more server computers (physical and/or virtual) and associated computer processor(s) (physical and/or virtual), operating system(s), web server(s), database(s), database server(s), and other server and application software adapted with informed communities functionality of the invention that will be described in more detail below. Those skilled in the art will be able to understand how to implement embodiments of the invention using such system(s), server(s) and associated software after being taught by the present examples.

Users 110 have host devices that can be any type of computing device a person can now or in the future use to access the Internet or other public wired or wireless network, and which can host conventional or future Internet access hardware (not shown) and software such as a web browser. For example, the user 110's host can be implemented by a personal computer such as a Mac, PC, notebook or desktop computer, which typically includes an operating system such as Windows, Unix variants or Mac OS, a browser application such as Windows Internet Explorer, Apple Safari, Firefox or Google Chrome, and network access hardware such as a wired or wireless modem. User 110's hosts are not limited to personal computers, but can include pad computers (e.g. iPad), cellular/smart phones (e.g. iPhone, Galaxy, etc.), personal digital assistants (PDAs), smart TVs, streaming devices or BluRay DVDs or other fixed or mobile computing devices, and those skilled in the art will understand how implementation details can be changed based on the particular type of host device.

Network 104 is, for example, the public Internet, but can further or alternatively include any combination of wired and wireless networks such as 2G, 3G, 4G, GSM, CDMA, TDMA or others, public and private, that are traversed by users who seek access to content on the public Internet, as will be appreciated by those skilled in the art. Preferably, system 100 is publicly accessible to users 110 via network 104 and the World Wide Web and protocols such as IP and http.

It should be noted that the block diagram in FIG. 1 is intended to be illustrative and not limiting, and those skilled in the art will appreciate various alternative configurations, topologies, etc. For example, while only one system 100 is shown, system 100 may implemented by many servers (physical and/or virtual), either in the same location and/or at the same network address, and/or distributed across many locations and/or network addresses. Moreover, in the example of FIG. 1 system 100 is shown as being separate from social networking sites 102 such as Facebook, LinkedIn, Twitter, etc. However, aspects of the invention can be partially or fully included in such social networking sites 102, either as fully integrated functionality or via application programming interface (API) calls provided by such social networking sites 102 and vice versa, and those skilled in the art will understand how to adapt such social networking sites 102 with some or all of the functionality of the invention after being taught by the present disclosure.

Figure 2:
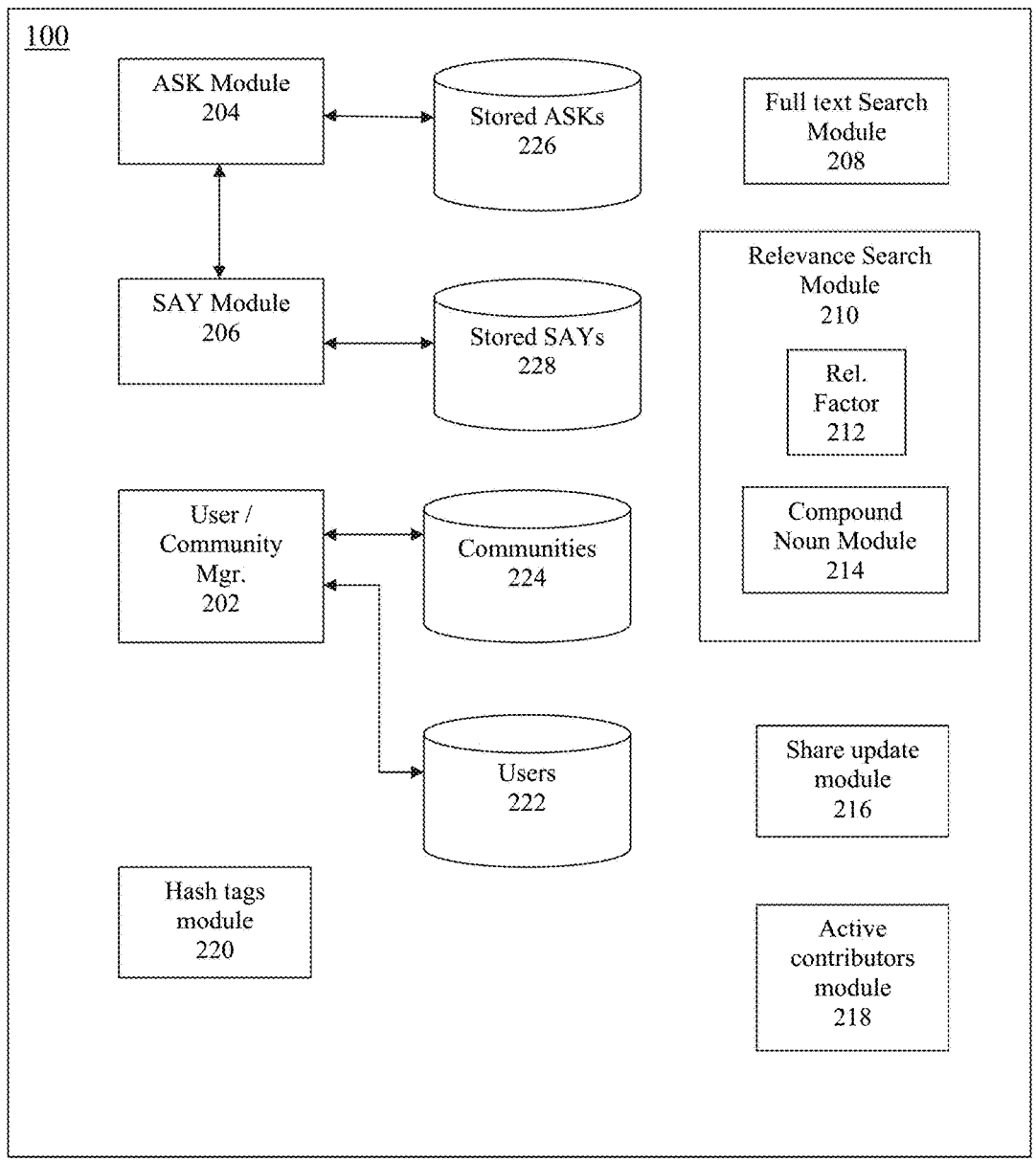
FIG. 2 is a block diagram illustrating an example informed communities system according to embodiments of the invention.

A block diagram illustrating an example system 100 according to embodiments of the invention is shown in FIG. 2. Although not shown in FIG. 2, it should be appreciated that system 100 can include web server functionality to interact with users 110 via network 104, the World Wide Web or native applications on mobile computing devices, and protocols such as IP, http, https, SOAP or REST. Such web server functionality preferably further includes the ability to interact with the illustrated modules to provide the functionality of embodiments of the invention to users via web pages, web services, scripts, etc. as will be described in more detail below. Further details of such well-known web server functionality will be omitted here for sake of clarity of the invention.

As shown in this example, system 100 includes a user/community manager 202 that manages and maintains information about users 222 and communities 224.

Information about communities 224 can include geographic boundaries (i.e. physical location) or common interests (i.e. logical) yet within a specific geographic but not "hyper" localized area, or any combination thereof. Typically, however, communities are confined to a reasonable geographic size. An example of a physical "hyper" local community is users 222 having or being students in a specific school or users 222 living in a specific residential neighborhood. An example of a logical community is one of "Bay Area commuters" that comprises users 222 living within the SF Bay Area of California comprising nine counties and covering an area of approximately 7000 sq. miles and having an interest in commuting topics local to the area.

There are many ways that communities 224 can be defined according to embodiments of the invention. For example, any user can interact with manager 202 to manually set up a community. As another example, communities can be automatically created by manager 202 based on profile information about users or specific market needs. When requesting to set up any new community, details such as community name, description, physical location or boundaries are preferably provided to manager 202. A new community can then be created, perhaps after review by an administrator. Example types of local communities in embodiments of the invention can include, but not limited to, school neighborhoods, college campuses, cause groups or interest groups.

Information about users 222 can include respective profile/demographic information such as name, display name, age/birth date, gender, residence location, type of employment, qualifications or interests. It should be apparent that information about users 222 can include login and/or password credentials, and that manager 202 can include authentication functionality for allowing users to access the system.

There are many ways that users 222 can be associated with communities 224 according to embodiments of the invention. For example, users 222 can interact with manager 202 to select any of existing communities 224 to which to belong. As another example, manager 202 can automatically put users 222 into one or more of communities 224 based on comparisons between user profile information in store 222 and information about communities in store 224. As another example, manager 202 can cause users to be automatically associated with a community after choosing a specific community to be the default, posting one or more ASKs to a specific community, posting one or more SAYs in response to an Open ASK (i.e. Direct SAY) in a specific community, sharing one Important Update in a specific community or creating/posting one or more hash tag messages in a specific community.

As further shown in the example of FIG. 2, system 100 includes an ASK module 204 and associated ASKs in storage 226.

According to certain aspects of the invention, ASK module 204 allows users to post a question (i.e. ASK) to a specific one of communities 224 on any topic or matters related to that specific community. ASK module maintains in storage 226 all Open ASKs. These are questions that a user chooses to keep open for other users in a specific community to view, respond, follow and/or search for. As such, ASK module 204 further includes functionality to allow users to cause ASKs to be stored in storage 226, respond to specific Open ASKs stored in storage 226, follow responses posted to specific ASKs in storage 226 (e.g. via notifications such as emails or texts), and/or to search for specific ASKs. ASK module 204 further maintains in storage 226 all ASKs. These are questions that a user chooses not to keep open for other users in a specific community to view, respond and follow.

In embodiments, ASKs are limited to short questions, for example comprising text or character count not exceeding a total of 140 characters. In response to newly posted ASKs, ASK module 204 runs searches using relevance search module 210 against stored SAYs in storage 228. Further, ASK module 204 runs searches against Open ASKs in storage 226 using full text search module 208 and relevance search module 210, to retrieve associated responses in storage 226, and return matches, if any are available, to the user. Should there be no results found or should the user be not happy with the quality of results produced, then he or she could choose to move the ASK to the Open ASKs stored in storage 226, thus making it visible for other users in the community to view and respond or follow.

As further shown in the example of FIG. 2, system 100 includes a SAY module 206 and associated SAYs in storage 228. SAY module 206 allows users to post any piece of information on matters or topics pertaining to a specific one of communities 224. In embodiments, the total character count for each SAY posted by the user cannot exceed 140.

According to certain aspects, users can post SAYs spontaneously, without solicitation, on any topic of interest related to communities 224. According to other aspects, "Direct" SAYs are posts that respond to Open ASKs which have already been posted in the community. In this regard, SAY module 206 keeps an identification of each "Direct" SAY in storage 228 as well as an identification in storage 226 of the particular ASK to which it corresponds to.

As further shown in FIG. 2, system 100 includes a full text search function 208. In embodiments, function 208 is called by ASK module 204 and SAY module 206 to perform a full text search on the inputted ASK or SAY against the stored Open ASKs in storage 226. Function 208 only returns exact matches, except perhaps for insubstantial differences such as spaces, spelling errors, punctuations, etc.

Relevance search function 210 is called by ASK module 204 to perform a relevance search between text inputted by a user and ASKs and SAYs in storages 226 and 228. In embodiments, instead of searching for exact matches, function 210 parses the inputted text to identify nouns, and then determines how many nouns in the inputted text match nouns in individual ASKs and SAYs in storage 226 and 228. "Relevant" matches are determined by the number of matching nouns.

As shown in the example of FIG. 2, function 210 includes relevance factor 212 and compound noun module 214. Although not shown in FIG. 2, includes a natural language parser such as Open NLP to identify language components of inputted text, such as nouns or other parts of speech contained in the user input. Any existing natural language parser including any advanced versions in the future can be used in embodiments of the invention.

Search function 210 uses relevance factor 212 to determine whether there is a relevant "match" based on the number of nouns identified in the text inputted by the user. For example, if six nouns are identified in the inputted, then a relevance factor of 60% (0.6) causes function 210 to return messages contained in storage 226 and 228 with four or more matching nouns (3.6 to be precise but rounded off to the next higher digit for fractions >=0.5). In the same manner, if the relevance factor is 80% (0.8), then function 210 will only return messages contained in storage 226 and 228 having against five or more matching nouns (4.8 to be precise but rounded off to the next higher digit for fractions >=0.5). In embodiments, the relevance factor is predetermined and set by an administrator to yield the most optimal search results, and can be adjusted or modified by the administrator accordingly. In some embodiments, this factor can be the same for all communities, or different communities can have different factors. In other embodiments, relevance search function 210 can compute a dynamic relevance factor to be used in a database program for executing the search process.

It should be noted that relevance search function 210 can perform even deeper analyses of the user message for parts of speech, assign appropriate weights to the identified parts of speech and/or to the message times, and/or to the message itself based on the author, employing machine learning techniques and incorporating mathematical models.

Compound noun module 214 identifies two or more proper nouns right next to each other, and combines them to form a single compound noun for the purpose of identifying matching messages by nouns. For example, module 214 takes the parsed output string of the inputted message from an Open Natural Language Parser (Open NLP), and if two or more common nouns are found in consecutive locations of the string, then they are combined to form a single compound proper noun (e.g. the compound noun "San Francisco" is identified as two separate common nouns namely "San" and "Francisco" in two consecutive locations of the parsed output, and module 214 applies logic to combine the two nouns as a single compound proper noun).

The following example compound noun routine 214 uses a parser output of an inputted text string, finds the nouns in the strings, and then forms compound nouns from any consecutive nouns:

```
public String findNouns(String search) {
    String [ ] sArr = runParser(search);
    ArrayList<String> list = new ArrayList<String>( );
    for (String s : sArr)
        if (!s.equals(""))
            list.add(s);
    sArr = list.toArray(new String[list.size( )]);
    String inputText = "";
    int i = 0;
    for(String s : sArr) {
        if(s.equals("NNP")||s.equals("NNS")) {
```

```
            inputText+=sArr[i+1]+",";
        }
        if(s.equals("NN") &&
            (sArr[i+2].equals("NN")||sArr[i+2].equals("NNS"))) {
                inputText+="\""+sArr[i+1]+" "+sArr[i+3]+"\""+",";
                sArr[i+1]=sArr[i+3]="";
        }
        if(s.equals("NN")&& !(sArr[i+1].isEmpty( )))
            inputText+=sArr[i+1]+",";
    i++;
    }
    System.out.println(inputText);
    return inputText;
}
```

Returning to FIG. 2, example embodiments of system 100 include a share important update module 216. This module allows users to share Important Updates with members of a specific community. In embodiments, the user chooses a community to SHARE an IMPORTANT UPDATE that needs to be broadcasted to all users in that community. In one example, the text length is limited to 140 characters. Once the user clicks on the SAY button provided, module 216 broadcasts the IMPORTANT UPDATE to all associated community participants via email or push notifications, using information in user store 222. For example, when a user shares an important update such as "today moreland middle school dismisses earliy at 1:10 pm" in a "moreland middle school" local community, all users associated with this specific community will receive this update.

As further shown, example embodiments of system 100 include an active contributors module 218. This module identifies the active contributors in every community. For example, the top ten active contributors in a community are chosen and displayed on the community's main page. The criteria for users to being on this list can be the total count of SAYs, Direct SAYs, Important Updates and SAYs posted for all hash tags in a particular community.

Still further, example embodiments of system 100 such as that shown in FIG. 2 include a hash tag module 220. This allows users to create and associate hash tags along with their corresponding SAYs for events and topics within a specific community. Hash tags make all related information easily sharable and searchable. In embodiments, any user can create a hash tag within a specific community with or without providing a brief description of it. Once created, all users associated with that community are notified via emails or push notifications, after which any user can choose to post a SAY for that hash tag, and/or choose to follow to receive SAYs posted by other users on that particular hash tag.

Although not shown in FIG. 2, example embodiments of system 100 can allow social media integrations, for example, interoperation with sites 102 such as Facebook and LinkedIn. In embodiments, users can log in or sign up with their Facebook and LinkedIn accounts, and by making API calls provided by these sites 102, the system can create a basic profile of the users for use in system 100 based off of user profile attributes shared by Facebook and LinkedIn, with the approval of the user. As another example, users can post an ASK or a SAY from system 100 to other sites 102 such as Facebook, LinkedIn and Twitter using all of their respective API services that currently exist to share Internet articles, etc.

Still further, embodiments of system 100 can include various methods for developing user analytics. In a first example called "Computed Intelligence," user analytics can be performed that provide a 360-degree view of a user by taking into account all community associations, the nature of message patterns posted within and across communities, all associated geographic locations and other personal profile attributes. In another example called "Real time Intelligence," user analytics can be performed to provide a real time snapshot of a user by taking into account the user's community association at the time of using service, the user's geographic location at the time of using service and the nature or contents of the message at the time of using service.

Additional aspects of ASK module 204 according to embodiments of the invention will now be described in connection with FIG. 3.

Figure 3:
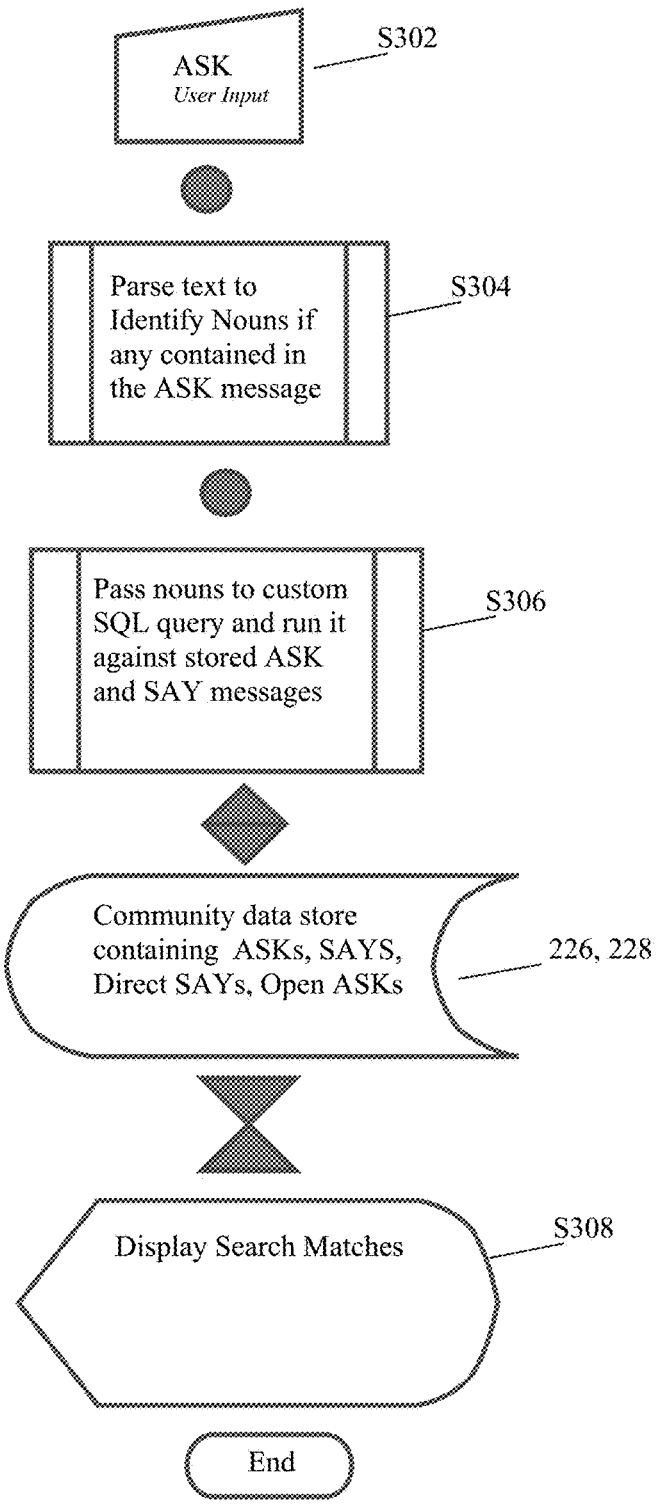
FIG. 3 is a flowchart of an ASK search function according to embodiments of the invention.

As shown in FIG. 3, in step S302, the user signs into his or her default community home or chooses any pre-defined community of choice after signing in and inputs text for an ASK. In embodiments, the user submits the request by clicking on an ASK button.

Next, module 204 performs a search using the inputted text.

In embodiments, module 204 first calls full text search function 208 to look for Open ASKs in storage 226 for the user's specific community that exactly match the user's newly posted ASK using a full text search function. If any matching Open ASKs are found in storage 226, then module 208 interacts with storage 228 to retrieve all direct SAYs associated with each of those matching Open ASKs.

Next, module 204 calls relevance search function 210 to performing relevance searches using the inputted text. As shown in step S304, relevance search function 210 first parses the user input sentence through the Open Natural Language Parser (NLP) to analyze the sentence for parts of speech. Function 210 then uses compound noun module 214 to identify any compound nouns, for example using the program described above. Function 210 then counts the number of nouns identified in the inputted text including the compound nouns.

With the nouns in the inputted text identified, as shown in step S306, search function 210 looks for Open ASKs in storage 226 for the users's specific community that match a relevance criteria (e.g. 80%) based on nouns identified in the posted ASK. If any matching Open ASKs are found in storage 226, then all direct SAYs associated with each of those matching Open ASKs are retrieved from storage 228.

Next, search function 210 looks for SAYs in storage 228 for the users's specific community that match a relevance criteria (e.g. 60%) based on nouns identified in the posted ASK. If any matching SAYs are found in storage 228, then they are retrieved from storage 228.

Finally as shown in step S308 all the search results obtained from the above searches are combined and displayed to the user.

According to certain aspects, the following example query can be used to perform the above full text and relevance search functions when user posts an ASK in embodiments of the invention, as well as combining all the results and ordering them by message time:

SELECT * FROM Message where ID in (SELECT DISTINCT ID from ((SELECT *,MATCH (Message) AGAINST ("'+messagePattern+'" in boolean mode) as Relevance from Message WHERE KeywordID="'+Keyword_ID+'" AND TenantID="'+Tenant_ID+'" having Relevance >="'+relFactor+'") UNION ALL (SELECT *,Null as Col12 from Message where KeywordID='SAY' AND]ParentID="'+id+'")UNION ALL (Select *,Null as Col12 from Message where ParentID in (SELECT Message.ID from Message,MessageConnections where Message.ID=MessageConnections.MessageID and MATCH (Message) AGAINST ("'"+messagePattern+"'"in boolean mode)>="'"+relFactorAsk+"'"and MessageConnections.TenantID="'"+Tenant_ID+"'"))) results) ORDER BY MessageTime DESC;

In embodiments, although not shown in FIG. 3, if no results are available for display or if the user is not happy with results produced, he or she could move it to a pool of "Open ASKs" for other users in the community to view and respond. Open ASKs are stored in the community specific area of storage 226 so other users can view and respond. In embodiments, the user posting the Open ASK is updated via email and/or push notifications when any responses are posted. Further, any user of the system can choose to follow this Open ASK and to be notified when responses are posted.

Figure 4A:
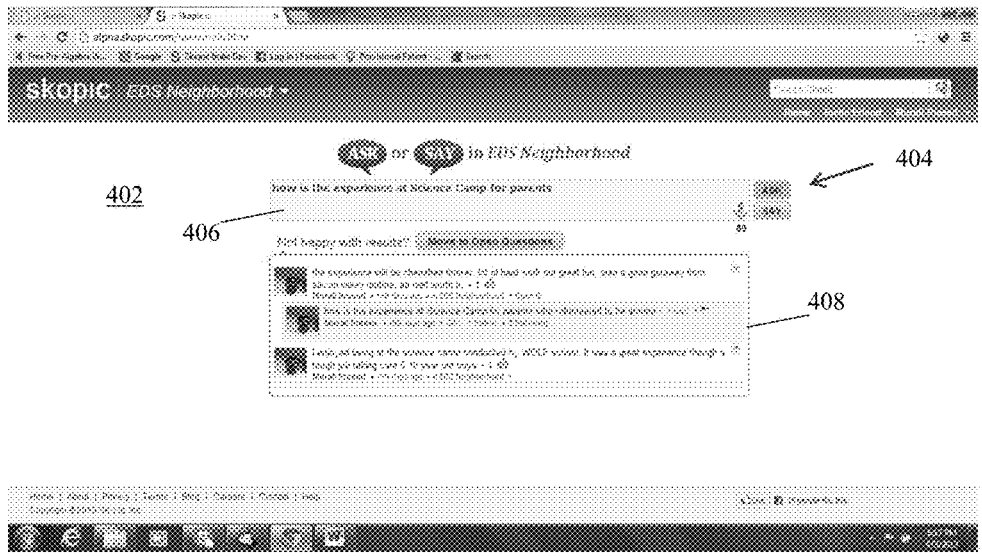
FIGS. 4A and 4B are screenshots illustrating example aspects of an ASK search function according to embodiments of the invention.
Figure 4B:
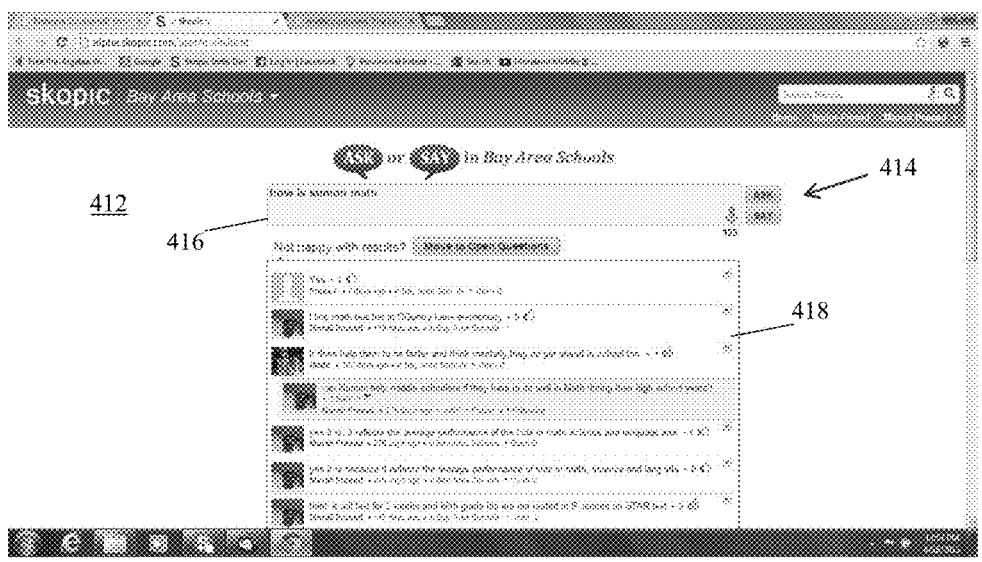

FIGS. 4A and 4B are example screenshots depicting example aspects of an ASK search function according to embodiments of the invention.

FIG. 4A is a screenshot illustrating an example home page 402 for an "EDS Neighborhood" community of users. In this example, page 402 has buttons 404 for selecting to enter an ASK or SAY, as well as a text entry field 406. In this example, the user has entered the question "how is the experience at Science Camp for parents?" in field 406, and the system has displayed Direct SAYs of matching ASKs and SAYs matching the relevance factor in field 408.

FIG. 4B is a screenshot illustrating an example home page 412 for a "Bay Area Schools" community of users. In this example, page 412 has buttons 414 for selecting to enter an ASK or SAY, as well as a text entry field 416. In this example, the user has entered the question "how is kumon math?" in field 416, and the system has displayed matching ASKs and SAYs in field 418.

It should be noted that home page 402 or 412 can be displayed after a user has signed on with system 100 and selected a community to be viewed. Additionally or alternatively, home pages 402 and 412 can be default home pages for a default community associated with the user. The user can reassign his/her default community on a settings page, for example.

Figure 5:
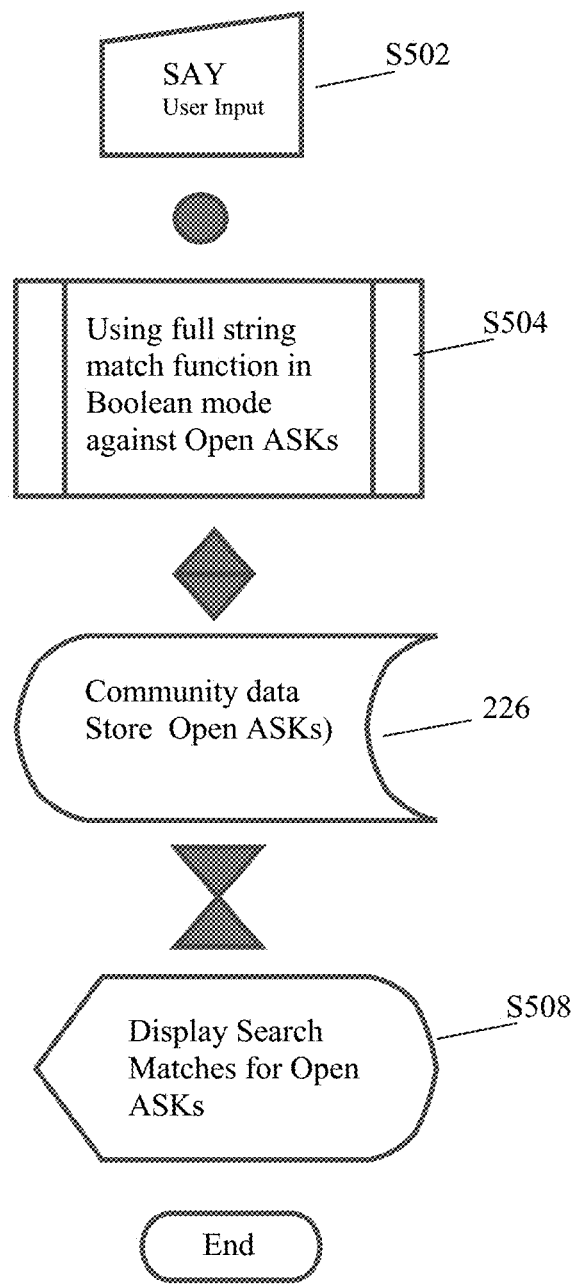
FIG. 5 is a flowchart of a SAY search function according to embodiments of the invention.

Additional aspects of SAY module 204 according to embodiments of the invention will now be described in connection with the flowchart of FIG. 5.

As shown in step S502, the user chooses a community and inputs text for a SAY message. In embodiments, the user submits his or her SAY by clicking a SAY button on a web page, for example.

Next in step S504, SAY module 206 performs a search of related Open ASKs. For example, module 206 passes the inputted string as-is to a custom SQL query for keyword(s) matches in a default Boolean mode to run against Open ASKs in storage 226.

The following is an example of a custom SQL query that can be used by module 206 for performing a search function against Open ASKs:

SELECT mm.ID from Message mm, MessageConnections mc WHERE MATCH (mm.Message) AGAINST ('lyn brook high school is good' in boolean mode) AND mm.TenantID='2' AND mc.Status='Active' AND mm.ID=mc.MessageID GROUP BY mm.ID ORDER BY mm.SayCount ASC, mm.MessageTime ASC In this example, the entire inputted string is passed as-is to the SQL query above, and using SQL string match functionality, the string is searched against all Open ASKs in a specific community whose status is "Active".

Next in step S508, the user is then presented with the matching set of "related" Open ASKs specific to that community to view and respond (if chooses to do so) for the benefit of other community members. Irrespective, the user's inputted SAY can be stored in the community specific section of data store 228 for future retrieval against a potential search match should any user post an ASK related to the identified keywords of the posted SAY message.

Figure 6A:
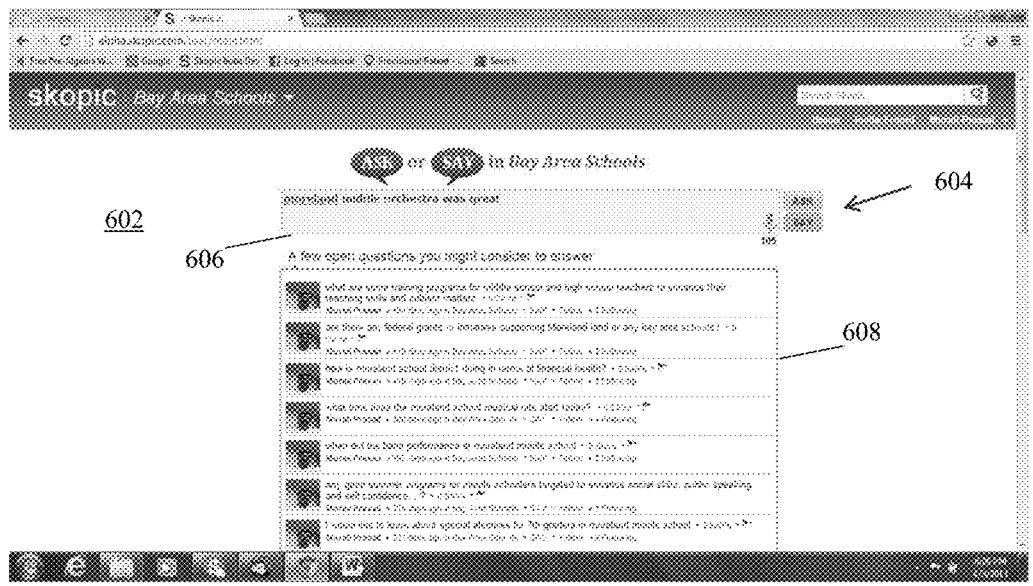
FIGS. 6A and 6B are screenshots illustrating example aspects of a SAY search function according to embodiments of the invention.
Figure 6B:
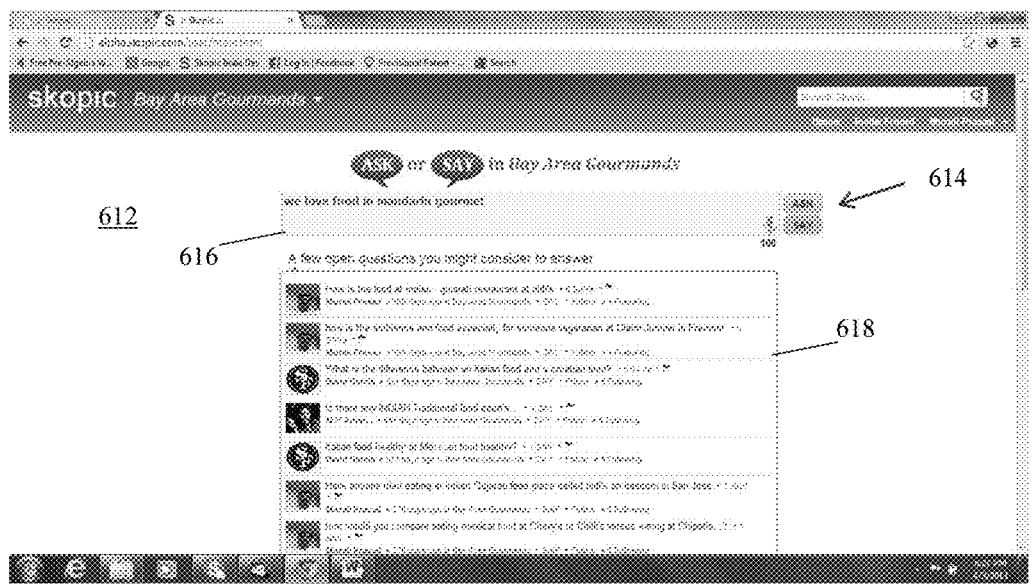

FIGS. 6A and 6B are example screenshots depicting example aspects of a SAY action according to embodiments of the invention.

FIG. 6A is a screenshot illustrating an example home page 602 for a "Bay Area Schools" community of users. In this example, page 602 has buttons 604 for selecting to enter an ASK or SAY, as well as a text entry field 606. In this example, the user has entered the statement "moreland middle orchestra was great" in field 606, and the system has displayed matching Open ASKs pertaining to the same community in field 608.

FIG. 6B is a screenshot illustrating an example home page 612 for a "Bay Area Gourmands" community of users. In this example, page 612 has buttons 614 for selecting to enter an ASK or SAY, as well as a text entry field 616. In this example, the user has entered the message "we love food in mandarin gourmet" in field 616, and the system has displayed matching Open ASKs pertaining to the same community in field 618.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
    maintaining, by a computer system, a plurality of communities such that independent textual without images information networking is provided within each of the plurality of communities, wherein each of the plurality of communities has a specific social context and includes a geographic boundary associated therewith, wherein each of the plurality of communities further comprises a plurality of users, and wherein a database maintains community specific information for each of the plurality of communities;
    providing, by the computer system, an ASK module for users belonging to a specific one of the communities to post ASKs via textual input not exceeding 140 characters in the specific community;
    providing, by the computer system, a SAY module for users belonging to the specific community to post SAYs via textual input not exceeding 140 characters in the specific community;
    uniquely associating the posted ASKs and SAYs with the specific community; and
    upon posting of a new ASK in the specific community by a certain one of the users belonging to the specific community:
        automatically by the computer system performing a search of all previously posted ASKs within the database for the specific community having text matching the new ASK,
        for any posted ASKs matching the new ASK, automatically determining by the computer system whether any posted SAYs for the specific community are directed to those matching ASKs, and presenting all directed SAYs of those matching ASKs to the certain user.

2. The method according to claim 1, wherein the performed search comprises a full text search for posted ASKs having text exactly matching the new ASK.

3. The method according to claim 1, wherein the performed search includes:
   parsing the new ASK to identify specific parts of speech in the new ASK;
   performing a relevance search for finding posted ASKs having a matching number of the specific parts of speech exceeding a relevance criteria.

4. The method according to claim 3, wherein the specific parts of speech are nouns.

5. The method according to claim 3, wherein the relevance criteria is predetermined.

6. The method according to claim 4, further comprising identifying two or more consecutively occurring nouns in the new ASK and forming a single compound noun therefrom, wherein the relevance criteria is determined based on combined count of single nouns and compound nouns.

7. The method according to claim 1, wherein upon posting of a new ASK on matters related to the specific community further includes:
   automatically by the computer system performing a search of the posted SAYs for the specific community matching the new ASK, and
   presenting all matching SAYs to the certain user.

8. The method according to claim 7, wherein the performed search includes:
   parsing the new ASK containing the textual input not exceeding 140 characters to identify specific parts of speech in the new ASK;
   performing a relevance search for finding posted SAYs within the database for the specific community having a matching number of the specific parts of speech exceeding a relevance criteria.

9. The method according to claim 8, wherein the specific parts of speech are nouns.

10. The method according to claim 8, wherein the relevance criteria is predetermined.

11. The method according to claim 9, further comprising identifying an occurrence of two or more consecutive nouns in the new ASK and forming a single compound noun therefrom, wherein the matching number is determined based on the single compound noun.

12. The method according to claim 1, further comprising:
   upon posting of a new SAY in the specific community by a certain one of the users belonging to the specific community:
      automatically by the computer system performing a search of the posted ASKs for the specific community matching the new SAY,
      presenting all matching ASKs to the certain user, and
      allowing the certain user to post a SAY directed to any of the matching ASKs.

13. The method according to claim 1, wherein after presenting all the matching ASKs and directed SAYs, the method further comprises allowing the user to designate the new ASK as Open and thereby public within that specific community so any user of the specific community can respond by posting directed SAYs and follow the new ASK to receive all directed SAYs and also view the new ASK and all corresponding directed SAYs.

14. The method according to claim 13, wherein the search of posted ASKs is limited to ASKs that have been designated by the posting users as Open.

15. The method according to claim 1, wherein the posted SAYs include SAYs directed to previously posted ASKs in the specific community, the method further comprising allowing a user belonging to the specific community to follow directed SAYs posted from time to time by other users for a specific posted ASK.

16. The method according to claim 1, wherein an Important Update is shared for the specific community, the method further comprising, automatically by the computer system, upon posting of the Important Update, notifying all users belonging to that specific community of that Important Update.

17. The method according to claim 1, further comprising identifying active contributors among the users belonging to the specific community.

18. The method according to claim 1, further comprising:
   allowing a creating user of the specific community to create a hash tag;
   notifying other users of the specific community regarding the hash tag;
   allowing users of the specific community to associate new posted SAYs with the hash tag; and
   allowing users of the specific community to view all posted SAYs that have been associated with the hash tag.

19. The method according to claim 8, further comprising:
   upon posting of a new SAY in the specific community by a certain one of the users belonging to the specific community:
      automatically by the computer system performing a search of the posted ASKs for the specific community matching the new SAY,
      presenting all matching ASKs to the certain user, and
      allowing the certain user to post a SAY directed to any of the matching ASKs.

20. The method according to claim 19, wherein after presenting all the directed SAYs of matching ASKs, the method further comprises allowing the user to designate the new ASK as Open for making it public within that specific community so any user of such community can respond by posting directed SAYs, follow a new ASK to receive all directed SAYs or simply view the new ASK and all its directed SAYs.

21. The method according to claim 20, wherein the search of posted ASKs is limited to ASKs that have been designated by the posting users as Open or otherwise made public within a specific community.

22. The method according to claim 19, further comprising:
   allowing the user of the specific community to create a hashtag that develops content involving a specific activity or topic or sub-group within the specific community and including a description of such a hashtag that does not exceed the 140 characters, so to directly align all associated user published content to that specific hashtag, and further, allowing users to share or stay connected with information related to such a hashtag by sending information using email or push notifications;
   further, notifying other users within the specific community regarding the creation of the hashtag when originated, using email or push notifications;
   allowing users of the specific community to associate new posted SAYs with the hash tag; and
   allowing users of the specific community to view all posted SAYs that have been associated with the hash tag.

23. The method according to claim 22, further comprising providing computed intelligence for ranking top 10 active contributors among the users belonging to the specific community based on the volume of messages posted by an individual, including undirected SAYs, directed SAYs for ASKs, HASH TAGS and UPDATES and presenting the ranking to a particular user.

24. The method according to the claim 1, further comprising a community manager who is a primary moderator for a specific community for the purpose managing information about users and the specific community.

25. The method according to the claim 1, further comprising selection of a Default Community by each user to complete a sign-up process.

26. The method according to the claim 1 further comprising sending notifications about Important Updates and creation of Hashtags in specific communities to such users who have a "follow" status.

27. The method according to the claim 1 further including the steps of:
 submitting, by a particular user, an online request to a system administrator for creating a new community, by providing, community name, community description, community address, and community geographic boundary; and
 approving or rejecting the online request by the system administrator; and
 notifying the requester of such approval or rejection.

28. The method according to claim 27 further including a notification being provided to all users of a specific community that are geographically proximate to the geographic boundary of the new community when the new community is approved and created.

29. The method according to claim 3 wherein the step of performing the relevance search includes using a weighted structure for identified parts of speech, message times and message author to retrieve matching ASKs and undirected SAYs.

30. The method according to claim 29 wherein a single configuration of a relevance search is applied across a plurality of communities and wherein another relevance search with different configurations can be applied to different communities.

31. The method according to claim 29 wherein a dynamic relevance factor is computed for executing the relevance search.

32. The method according to claim 1 wherein the plurality of communities include a plurality of schools, each school being a different specific community.

* * * * *